United States Patent

Maute

[11] Patent Number: 5,108,050
[45] Date of Patent: Apr. 28, 1992

[54] AUTONOMOUS ORBIT CONTROL METHOD AND SYSTEM FOR A GEOSTATIONARY SATELLITE

[75] Inventor: Alexandre P. A. Maute, Valbonne, France

[73] Assignee: Aerospatiale Societe Nationale Industrielle, Paris, France

[21] Appl. No.: 416,694

[22] Filed: Oct. 3, 1989

[30] Foreign Application Priority Data

Oct. 6, 1988 [FR] France .................... 88 13121

[51] Int. Cl.$^5$ .......................... B64G 1/36; B64G 1/24
[52] U.S. Cl. ................................ 244/171; 244/164
[58] Field of Search ............... 244/171, 164; 356/141, 356/152

[56] References Cited

U.S. PATENT DOCUMENTS 4,617,634  10/1986  Izumida et al. ............... 244/171
4,786,018  11/1988  Cope ............................. 244/171

FOREIGN PATENT DOCUMENTS 0267086  5/1988  European Pat. Off. ......... 244/164
0338687  10/1989  European Pat. Off. ......... 244/171

*Primary Examiner*—Joseph F. Peters, Jr.
*Assistant Examiner*—Anne E. Bidwell
*Attorney, Agent, or Firm*—Browdy and Neimark

[57] ABSTRACT

A stationkeeping method for a satellite in geostationary orbit comprises the steps of:
determining at the same time the angle $\alpha_1$ between the satellite-Sun direction and the satellite-Earth direction and the angle $\alpha_2$ between the satellite-Pole Star direction and the satellite-Earth direction,
deducing therefrom a state vector E consisting in orbital parameters by the formuls:

$$Z = H.E + C.B$$

where:
Z is a measurement vector the components of which are deduced from the angles $\alpha_1$ and $\alpha_2$,
H is a measuring matrix,
C is a bias sensitivity matrix,
B is a bias vector determined beforehand by comparison of the measured vector Z and measurements made on the ground,
determining stationkeeping manoeuvres and applying same by using thrusters.

12 Claims, 2 Drawing Sheets

AUTONOMOUS ORBIT CONTROL METHOD AND SYSTEM FOR A GEOSTATIONARY SATELLITE

The invention concerns controlling the orbit of space vehicles such as satellites and is more particularly directed to space vehicles in geostationary orbit (in which case the expression "stationkeeping" is usually used as a synonym for "geostationary orbit control").

The position and speed of a satellite in orbit can be deduced from a known state vector E formed from six orbital parameters such as, for example:

the major half-axis of the orbit, usually designated a;
the eccentricity vector defined in the plane of the orbit by its coordinates:

$$e_x = e \cdot \cos\omega$$

$$e_y = e \cdot \sin\omega$$

where e is the eccentricity of the orbit (dimensionless parameter) and $\omega$ is the argument of the perigee;

the inclination vector of the orbit defined by its coordinates:

$$i_x = i \cdot \cos\Omega$$

$$i_y = i \cdot \sin\Omega$$

where i is the inclination (in degrees), that is to say the angle of the plane of the orbit relative to the terrestrial equator, and $\Omega$ is the right ascension of the ascendant node (which designates the orientation of the line of nodes relative to any predetermined inertial frame of reference);

the mean longitude $l_m$.

If the satellite was subjected only to the gravity field of a homogeneous and perfectly spherical Earth the orbital parameters of the state vector E would remain constant (a=42.164 km, $e_x=e_y=0$ and $i_x=i_y=0$, $l_m$=parking - or set point -longitude) and the satellite would remain strictly geostationary.

However, because of disturbances due in particular to the non-spherical shape of the Earth and the non-homogeneous nature of terrestrial gravity, the attraction of heavenly bodies such as the Sun and the Moon and solar pressure forces, the orbital parameters change slowly.

The function of a geostationary satellite requires in practice that it be held in a narrow window in terms of longitude and latitude (with a width typically between 0.05 and 0.1 degree). This requires correction (or "stationkeeping") maneuvers which are currently computed and transmitted to the satellite by one or more control stations on the ground and based on measurements by means of antennas on the ground.

Stationkeeping therefore requires at present a permanently manned infrastructure on the ground (24 hours a day, 365 days a year), resulting in high satellite operating costs. This problem is compounded by possible problems with the availability of a suitable location for constructing a control center and with the need to make it secure.

The object of the invention is to enable autonomous computation on board the satellite of the orbital parameters and the stationkeeping maneuvers to be executed so that it is possible to dispense with continuous assistance from the ground and to involve a control center on the ground only occasionally.

To this end the invention proposes a station-keeping method for a satellite in geostationary orbit characterized in that:

there are determined at the same time the angle $\alpha_1$ between the satellite-Sun direction and the satellite-Earth direction and the angle $\alpha_2$ between the satellite-Pole Star direction and the satellite-Earth direction, there is deduced therefrom a state vector E consisting in orbital parameters by the formula:

$$Z = H \cdot E + C \cdot B$$

where:

Z is a measurement vector the components of which are deduced from the angles $\alpha_1$ and $\alpha_2$,
H is a measuring matrix,
C is a bias sensitivity matrix of the form $$\begin{pmatrix} X_s & Y_s & 0 \\ 0 & 0 & Y_p \end{pmatrix}$$

where $X_s$ is a term corresponding to a period substantially equal to one day, $Y_s$ is a term corresponding to a period substantially equal to one year and $Y_p$ is a term characteristic of the movement of the Pole Star, B is a bias vector determined beforehand by comparison of the measured vector Z and measurements made on the ground, stationkeeping maneuvers are determined consequently and applied by means of thrusters.

Thus in accordance with the invention the position of the satellite in space is characterized by the angles of the Sun and the Pole Star to the Earth as seen from the satellite.

The angles $\alpha_1$ and $\alpha_2$ are preferably determined from measurements effected by at least one terrestrial detector a plurality of solar detectors and a stellar detector oriented towards the North along the South-North axis of the satellite, the measurements from these detectors being filtered separately so as to obtain for these measurements an overall time-delay (detector intrinsic time-delay plus filter time-delay) that is exactly the same.

The invention also proposes a stationkeeping system comprising:

at least one terrestrial detector provided with a filter adapted to generate a time-delay such that the overall time-delay (detector intrinsic time-delay plus filter time-delay) has a predetermined value, a plurality of solar detectors provided with a filter adapted to generate a time-delay such that the overall time-delay is equal to said predetermined value, at least one stellar detector oriented towards the North along the South-North axis of the satellite provided with a filter adapted to generate a time-delay such that the overall time-delay is equal to said predetermined value, a position computation unit connected to these filters and adapted to deduce from the filtered measurements from said detectors the angle $\alpha_1$ between the satellite-Sun direction and the satellite-Earth direction and the angle $\alpha_2$ between the satellite-Pole Star direction and the satellite-Earth direction, an orbital parameter computation unit connected to the output of the position computation unit and adapted to determine the state vector E of the satellite made up of orbital parameters according to the formula:

$$Z = H \cdot E + C \cdot B$$

a bias computation auxiliary unit connected to the output of the position computation unit and to a telemetry unit in communication with the ground, the output of said bias computation auxiliary unit being connected to the orbital parameter computation unit, adapted to determine and memorize the bias vector B by comparing the vector E with corresponding measurements from the ground, and a control unit connected to stationkeeping thrusters. According to preferred features:

an attitude determination unit is connected to the outputs of the terrestrial, solar and stellar detectors and to the output of the orbital parameter computation unit, the orbital parameter computation unit is a KALMAN filter, the bias computation auxiliary unit is a FRIEDLAND filter.

Objects, characteristics and advantages of the invention will emerge from the following description given by way of non-limiting example only with reference to the appended drawings in which:

FIG. 3 shows the simulation over one year of the path of a satellite of this kind.

FIG. 1 shows schematically a satellite 1 in an orbit 2 about the Earth.

The satellite 1 is conventionally associated with a frame of reference X Y Z, in which the X axis is tangential to the orbit 2 and oriented in the direction in which the orbit is travelled (from West to East) and the Z axis is directed towards the Earth (geocentric axis).

The satellite comprises a platform carrying solar panels 3, reflectors 4 and propulsion thrusters of any appropriate known type.

Also in the known way the platform of this satellite comprises at least one terrestrial sensor oriented towards the Earth and schematically represented at $T_1$ together with a plurality of solar detectors distributed in a plane parallel to the plane of the X and Z axes and adapted to face the Sun successively as the satellite completes its orbit. Various configurations are known; to give an example, there are in this instance three solar detectors $S_1$, $S_2$, $S_3$ with one sensor $S_2$ disposed on the side facing towards the Earth and the other two sensors $S_1$ and $S_3$ on the edges opposite this side.

In accordance with the invention the platform of the satellite is also provided, in this instance on its North side (opposite the Y axis), with a stellar detector P of any appropriate known type oriented towards the North along the South-North axis. This is a detector chosen from the SODERN or GALILEO range, for example.

As is known, there are currently important differences between the aforementioned three types of detectors, even if they are all optical detectors.

Firstly, the solar detectors $S_1$ through $S_3$, terrestrial detector $T_1$ and stellar detector P are classified in this order by decreasing incident radiated power.

Also, these known detectors are sensitive to different radiation spectra; the terrestrial detectors are sensitive to infra-red radiation from the Earth, the solar detectors are formed of photo-electric cells and the stellar detectors are based on rows or arrays of charge-coupled devices (CCD).

Finally, these detectors conventionally comprise integrated filters introducing different time-delays.

The invention exploits the fact that the Pole Star is the only star of its magnitude to be always in the field of view of a stellar detector, mounted on the North side of a satellite so that its recognition does not require sophisticated software.

The terrestrial detector $T_1$, solar detectors $S_1$ through $S_3$ and stellar detector P make it possible to determine at any time the angular orientation of the Earth, the Sun and the Pole Star in the frame of reference related to the satellite.

Figure 1:
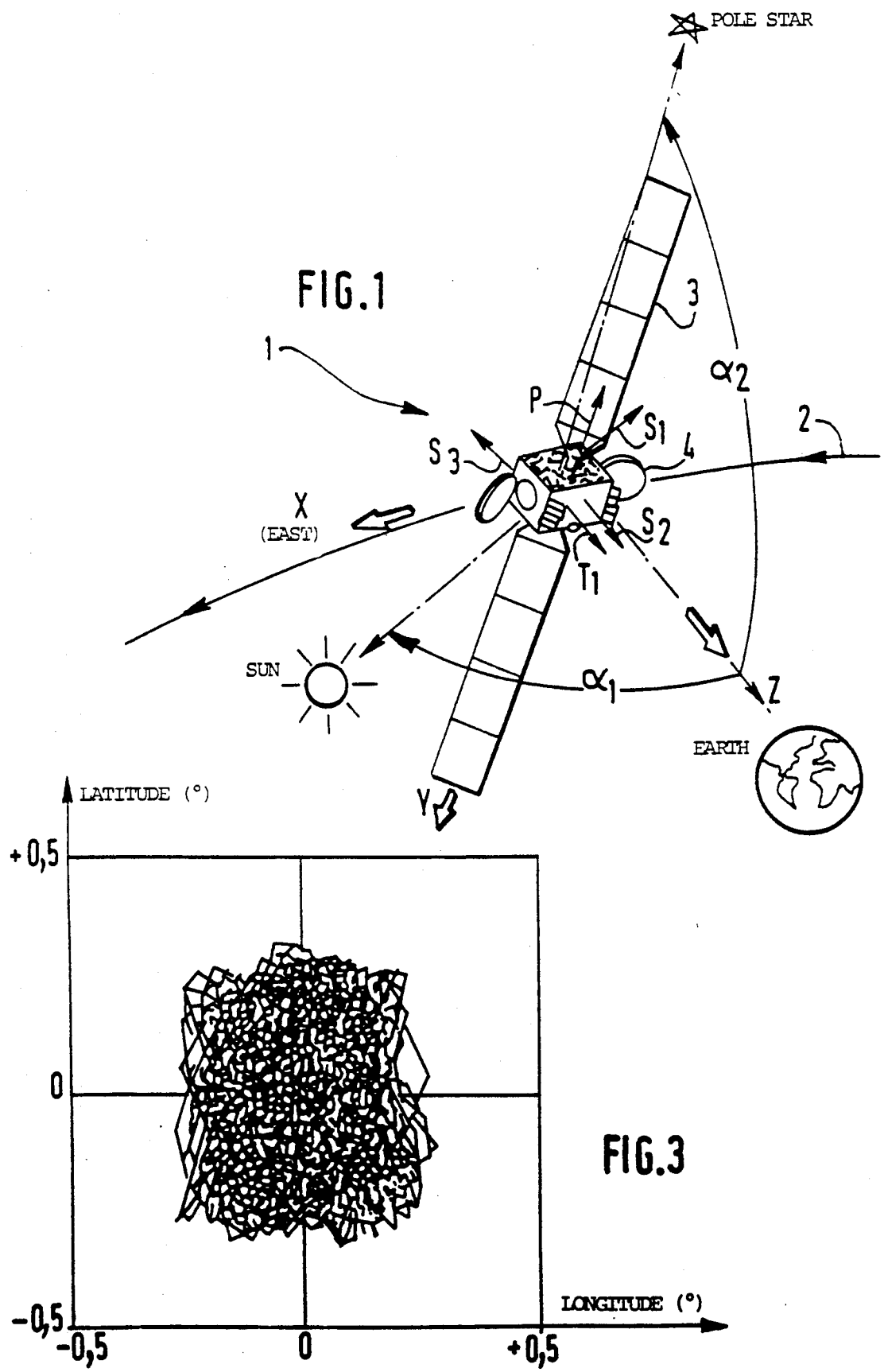
FIG. 1 is a schematic view of a satellite equipped with an autonomous orbit control system in accordance with the invention.
Figure 2:
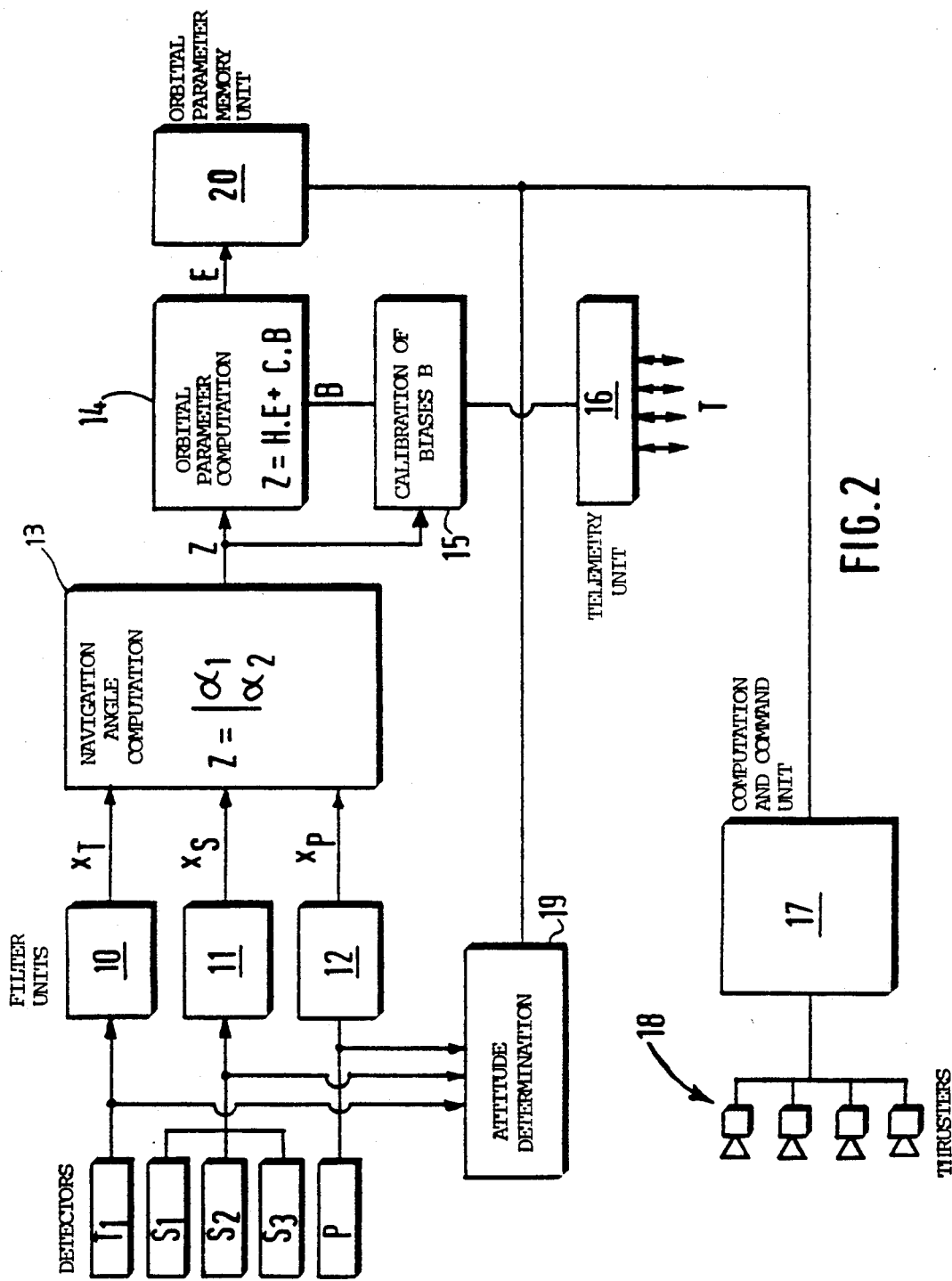
FIG. 2 is a simplified schematic of this autonomous geostationary orbit control system.

FIG. 2 shows the structure of the autonomous geostationary orbit control system.

Associated with the detectors $T_1$, $S_1$ through $S_3$ and P are parallel filter units 10, 11 and 12 in a filter and synchronization device the outputs of which are connected to a position computation unit 13 followed by an orbital parameter computation unit 14 with which is associated a calibration auxiliary unit 15 also connected to the position computation unit 13 and connected to a telemetry unit 16 in communication with the ground. The output of the orbital parameter computation unit is connected to a computation and command unit 17 controlling the stationkeeping thrusters 18. An attitude determination unit 19 is connected to the unfiltered outputs of the detectors $T_1$, $S_1$ through $S_3$ and P and to the output of the orbital parameters computation unit 14. In practice a unit 20 is associated with the computation unit 14 to store the orbital parameters computed by the unit 14.

In practice the computation units 13, 14, 15, 17, 18 may be integrated into the onboard computer of the satellite.

In accordance with the invention the position of the satellite in space is characterized by measuring at the same time the respective angular offsets $\alpha_1$ and $\alpha_2$ between the Sun and the Earth and between the Pole Star and the Earth as seen from the satellite.

The method of computing the angles $\alpha_1$ and $\alpha_2$, which computation is performed by the computation unit 13, is within the normal competence of those skilled in the art.

In outline, these computations may be summarized as follows, where $R_T$, $R_S$ and $R_P$ denote frames of reference respectively related to the terrestrial detector, to the solar detectors and to the stellar detector. It is known how to define matrices $P_S$ and $P_P$ for passing from the frames of reference $R_S$ and $R_P$ to the frame of reference $R_T$. The measurement from the solar and stellar detectors consists of a unit vector $X_S$ or $X_P$ directed from the satellite towards the Sun or the Pole Star.

Each of these vectors may be written in the frame of reference $R_T$:

$$X_S = P_S^{-1} \cdot X_S$$

$$X_P = P_P^{-1} \cdot X_P$$

and the navigation angles $\alpha_1$ and $\alpha_2$ deduced from:

$$\cos \alpha_1 = X_S \cdot X_T$$

$$\cos \alpha_2 = X_P \cdot X_T$$

In practice, to obtain the measured angles $\alpha_1$ and $\alpha_2$ at exactly the same time the invention proposes during a first stage (at 10, 11 and 12) to filter differently the raw measurements from the various detectors so as not only to obtain an appropriate predetermined residual noise level but also to add a time-delay differing from one detector to another and such that the overall time-delay associated with each detector (or group of detectors of the same kind), that is to say the sum of the time-delay inherent to each detector and the additional time-delay introduced by the associated filter 10, 11 or 12, is the same for all the measurements. This synchronizes the measurements which eliminates their influence on the attitude, which is subject to variations that can be very fast.

The overall time-delay is chosen as equal to ten seconds for example.

It is therefore possible to process at 13 a pair of navigation angles with only a moderate period, typically every ten minutes, which does not represent a significant increase in load for the onboard computer.

Let Z be a measurement vector constituted from the navigation angles $\alpha_1$ and $\alpha_2$.

The computation unit 14 is adapted to deduce the state vector E combining the orbital parameters from a of the type:

$$Z = H \cdot E + C \cdot B$$

where
H is a measurement matrix,
B is a bias vector,
and C is a bias sensitivity matrix of the type:

$$C = \begin{pmatrix} X_S & \cdot Y_S & 0 \\ 0 & 0 & Y_P \end{pmatrix}$$

where
$X_s$ is a term corresponding to a period approximating one day, $Y_S$ is a term representing a period approximating one year and $Y_P$ is a term representing a period approximating the apparent movement of the Pole Star.

Determining the components of the measurement matrix H is within the normal competence of those skilled in the art, given the definitions selected for the vectors Z and E.

The same goes for the components of matrix C.

In the following example there have been chosen for the vectors Z and E definitions slightly different to those given hereinabove:

$$-Z = (\cos x_1 - \cos x_{1syn}, x_{2syn})^T$$

where the subscript "syn" is associated with the value of the parameter $x_1$ or $x_2$ for the satellite assumed to be in an ideal, non-disturbed geosynchronous orbit and where the superscript "T" indicates a vector or matrix transposition;

$$-E = (\eta, \xi, e_x, e_y, i_x, i_y)^T$$

where
$\eta = a - a_{syn}$
$\xi = \phi + \omega + M - 1_m$
$e_x = e \cdot \cos(\Omega + \omega)$
$e_y = e \cdot \sin(\Omega + \omega)$
$i_x = i \cdot \cos \Omega$
$i_y = i \cdot \sin \Omega$ with M denoting the mean anomaly, e denoting the eccentricity of the orbit, $\omega$ denting the argument of the perigee; and a denting the major half-axis of the orbit; the matrix H is then written $$\begin{bmatrix} H_1 \\ \hline H_2 \end{bmatrix}$$

$H_1 = [0, x_1 \cdot \sin 1 - y_1 \cdot \cos 1, (1 - \cos 21) \cdot x_1 - \sin 21 \cdot y_1,$
$-x_1 \cdot \sin 21 + (1 + \cos 21) \cdot y_1, -z_1 \cdot \sin 1, z_1 \cdot \cos 1]$ and $H_2 = 1/\sin x_{2syn} [0, x_2 \sin 1 - y_2 \cdot \cos 1, (1 - \cos 21) \cdot x_2 - \sin 21 \cdot y_2, -x_2 \cdot \sin 21 + (1 + \cos 21) \cdot y_2, -z_2 \cdot \sin 1, z_2 \cdot \cos 1]$ where
$1 = 1_m$ (parking longitude) $+ \theta$ (sidereal time),
$(x_1, y_1, z_1)$ is the unit vector (Earth-Sun center) and
$(x_2, y_2, z_2)$ is the unit vector (Earth-Pole Star center).

The parameters $X_s$, $Y_s$ and $Y_p$ of matrix C correspond to the coordinates of the same unit vectors if, changing the previous notation, these coordinates are written $(X_s, Y_s, Z_s)$ for the Sun and $(X_p, Y_p, Z_p)$ for the Pole Star.

As already explained, the form of H depends on the precise form chosen for Z and E.

The object of the bias vector B is to take into account internal errors and detector alignment errors.

Even if these errors were carefully calibrated on the ground, the environment and the launch process would be likely to alter them.

Also, it is currently recognized that it is impossible to calibrate them individually in flight because these biases or offsets cannot be observed.

Nevertheless, in the context of the invention it has been noted that it is possible to evaluate the overall effect of all these biases on the two navigation angles by means of a bias sensitivity matrix of the aforementioned type.

According to the invention, the procedure for calibrating the biases is as follows: the position of the satellite and its orbital parameters are determined regularly on the ground (for example, after the satellite is placed in orbit and then once a year) and these orbit parameters and/or the associated navigation angles are then uploaded to the satellite by the telemetry unit 16. The parameters are then processed together with the value Z deduced from the measurements from the detectors by the auxiliary computation unit 15 which deduces from them the new value of the bias vector B. The bias vector, once estimated at the end of a period of around ten days, is stored in the unit 15 until the next calibration. The computation function of the unit 15 may then be deactivated so as not to load unnecessarily the onboard computer.

The computation unit 14 is in practice an orbit estimating filter, a KALMAN filter, for example, the equations for which are well known to those skilled in the art.

The computation auxiliary unit 15 is in practice a filter, for example a filter of the FRIEDLAND type the equations of which are also well known. They make it possible to evaluate B from several measurements.

Simulations carried out over one year have made it possible to verify that it is possible to maintain in this way a satellite within a window of 0.05 degree in longitude and latitude (see FIG. 3) with the following accuracy (three times the mean standard deviation) for the orbital parameters:

at a = 50 m
at $e_X = (3.5)\ 10^{-5}$
at $e_Y = (3.5)\ 10^{-5}$
at $i_x$ and $i_y = 0.0001$ degrees
at longitude $= 0.005$ degrees The raw measurements from the detectors (before filtering, and therefore corresponding to slightly different times) can be used by the unit 18 to determine the three attitude angles of the satellite (yaw, roll, pitch) from the orbital parameters supplied by the unit 14 and therefore autonomously (the time constants of the filters integrated into the detectors are usually around a few tenths of a second for the solar detectors, 0.5 seconds for the terrestrial detector and 0.1 to 0.5 seconds for the stellar detector).

The FIG. 2 system therefore constitutes an entirely autonomous system for determining the orbit and the attitude.

It goes without saying that the foregoing description has been given by way of non-limiting example only and that numerous variations thereon may be proposed by those skilled in the art without departing from the scope of the invention, in particular with regard to the arrangement of the solar detectors.

I claim:

1. Stationkeeping method for a satellite in geostationary orbit comprising the steps of:
   determining at the same time the angle $\alpha_1$ between the satellite-Sun direction and the satellite-Earth direction and the angle $\alpha_2$ between the satellite-Pole Star direction and the satellite-Earth direction.
   deducing therefrom a state vector E consisting in orbital parameters by the formula:

$$Z = H \cdot E + C \cdot B$$

where
   Z is a measurement vector the components of which are deduced from the angles $\alpha_1$ and $\alpha_2$,
   H is a measuring matrix with a number of lines equal to the number of said components in Z and with a number of columns equal to the number of said orbital parameters in E,
   C is a bias sensitivity matrix of the form $$\begin{pmatrix} X_s & Y_s & 0 \\ 0 & 0 & Y_p \end{pmatrix}$$

where $X_s$ is a term corresponding to a period substantially equal to one day, $Y_s$ is a term corresponding to a period substantially equal to one year and $Y_p$ is a term characteristic of the movement of the Pole Star,
   B is a bias vector determined beforehand by comparison of the measured vector Z and measurements made on the ground,
   determining stationkeeping maneuvers from vector E and applying same by means of thrusters.

2. Method according to claim 1 wherein said angles $\alpha_1$ and $\alpha_2$ are determined from measurements effected by at least one terrestrial detector, a plurality of solar detectors and a stellar detector oriented towards the North along the South-North axis of the satellite, said measurements form these detectors being filtered separately so as to obtain for these measurements an overall time-delay (detector intrinsic time-delay plus filter time-delay) that is exactly the same.

3. The method of claim 1 wherein the orbital parameters in the state vector E are six in number, respectively representative of the major half-axis of the orbit, two coordinates of the eccentricity vector in the plane of the orbit, two coordinates of the inclination vector of the orbit and the mean longitude of the satellite, and the components in said measurement vector are two in number.

4. Stationkeeping system comprising:
   at least one detector provided with a filter adapted to generate a time-delay such that the overall time-delay (detector intrinsic time-delay plus filter time-delay) has a predetermined value,
   a plurality of solar detectors provided with a filter adapted to generate a time-delay such that the overall time-delay is equal to said predetermined value,
   at least one stellar detector oriented towards the North along the SouthNorth axis of the satellite provided with a filter adapted to generate a time-delay such that the overall time-delay is equal to said predetermined value,
   a position computation unit connected to these filters and adapted to deduce from the filtered measurements from said detectors the angle $\alpha_1$ between the satellite-Sun direction and the satellite-Earth direction and the angle $\alpha_2$ between the satellite-Pole Star direction and the satellite-Earth direction,
   an orbital parameter computation unit connected to the output of the position computation unit and adapted to determine the state vector E of the satellite made up of orbital parameters according to the formula:

$$Z = H \cdot E + C \cdot B$$

where:
   Z is a measurement vector the components of which are deduced from the angles $\alpha_1$ and $\alpha_2$,
   H is a measuring matrix with a number of lines equal to the number of said components in Z and with a number of columns equal to the number of said orbital parameters in E,
   C is a bias sensitivity matrix of the form $$\begin{pmatrix} X_s & Y_s & 0 \\ 0 & 0 & Y_p \end{pmatrix}$$

where $X_s$ is a term corresponding to a period substantially equal to one day, $Y_s$ is a term corresponding to a period substantially equal to one year and $Y_p$ is a term characteristic of the movement of the Pole Star, B is a bias vector determined beforehand by comparison of the measured vector Z and measurements made on the ground, a bias computation auxiliary unit connected to the output of the position computation unit and to a telemetry unit in communication with the ground, the output of said bias computation auxiliary unit being connected to the orbital parameter computation unit, adapted to determine and memorize the bias vector B by comparing the vector E with corresponding measurements from the ground, and a control unit connected to stationkeeping thrusters.

5. System according to claim 4 further comprising an attitude determination unit connected to the outputs of the terrestrial, solar and stellar detectors and to the output of the orbital parameter computation unit.

6. System according to claim 5 wherein said orbital parameter computation unit is a KALMAN filter.

7. System according to claim 6 wherein said bias computation auxiliary unit is a FRIEDLAND filter.

8. System according to claim 5 wherein said bias computation auxiliary unit is a FRIEDLAND filter.

9. System according to claim 4 wherein said orbital parameter computation unit is a KALMAN filter.

10. System according to claim 9 wherein said bias computation auxiliary unit is a FRIEDLAND filter.

11. System according to claim 4 wherein said bias computation auxiliary unit is a FRIEDLAND filter.

12. The method of claim 4 wherein the orbital parameters in the state vector E are six in number, respectively representative of the major half-axis of the orbit, two coordinates of the eccentricity vector in the plane of the orbit, two coordinates of the inclination vector of the orbit and the mean longitude of the satellite, and the components in said measurement vector are two in number.

* * * * *